Patented July 22, 1941

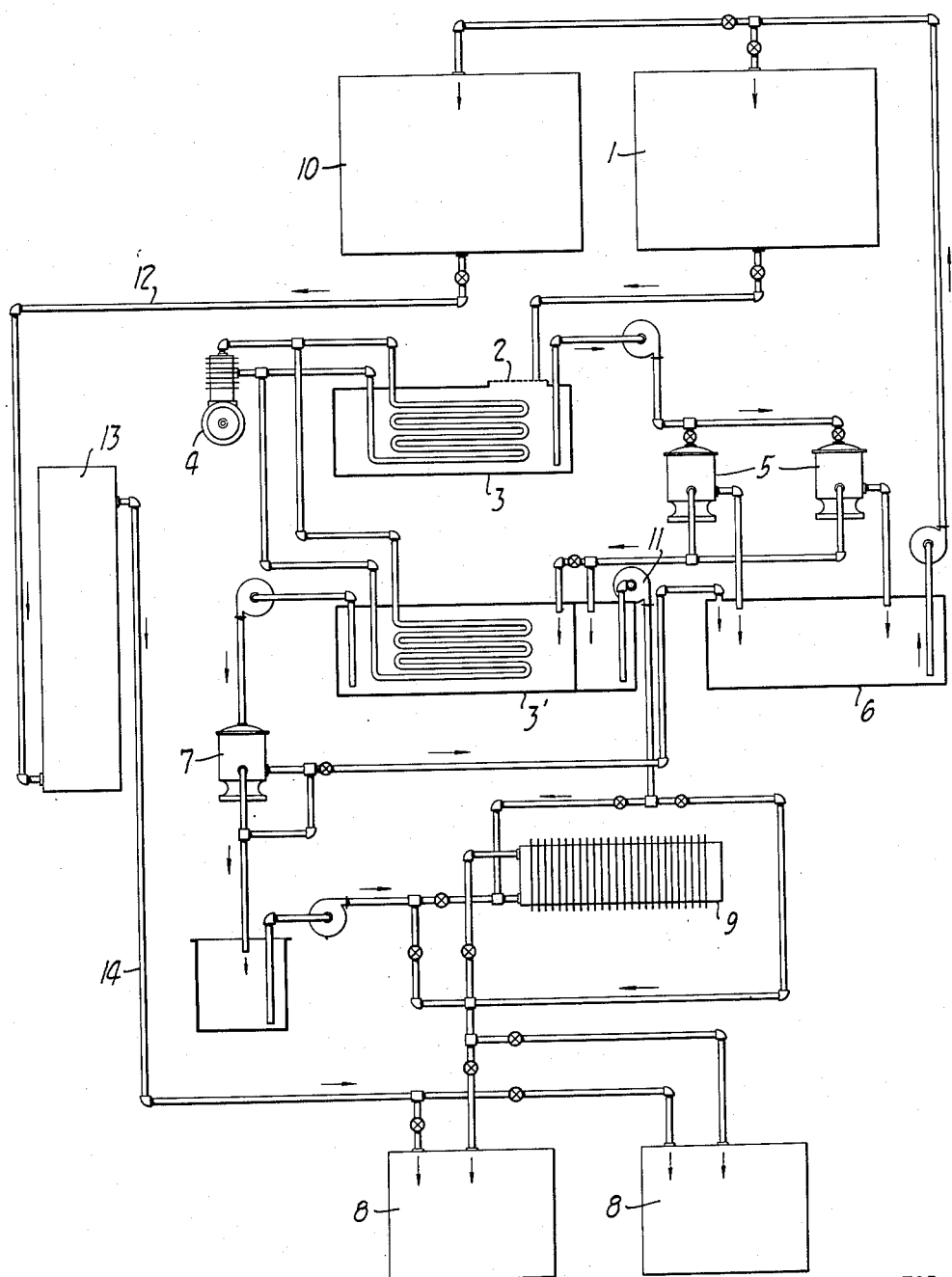

2,249,830

UNITED STATES PATENT OFFICE 2,249,830

WINE PROCESS

Frank W. Hopper, Selma, Calif.

Application March 27, 1939, Serial No. 264,323

6 Claims. (Cl. 99—35)

This invention relates to the making of wine and has for one of its objects an improved process that will more rapidly produce wine of improved flavor and bouquet than heretofore.

Another object is improved steps in the process of making either fortified or unfortified wine from must that will materially reduce the time heretofore required for producing proper finished wine.

Another object is a process for producing brandy of improved flavor and bouquet, which brandy may be produced alone or may be used in fortifying wine to produce fortified wine of improved bouquet and flavor.

Another object is a process that results in a more economical production of wine than heretofore, and which process prevents the loss of alcohol during the making thereof and reduces the likelihood of loss through bacteriological or mycological infection.

Another object is a process that utilizes the beneficial elements in the lees for producing wine and brandy of improved bouquet and flavor.

A still further object is an improved combination of apparatus for use in the process of making wine.

Other objects and advantages will appear in the description and drawing annexed hereto.

The drawing is a diagrammatic view illustrating apparatus adapted to carry out my process.

Briefly described, heretofore, in the production of wines, considerable time has been lost in racking and fining, to remove the undesirable insoluble solids. Also since the natural wine yeast cells at the beginning of fermentation are relatively few in number, much of the wine produced is inferior or lost, due to the failure of said natural wine yeast to assert the desired predominating influence during fermentation, with the result, among others, of an insufficient production of the esters and other subsidiary products desirable for contributing to the bouquet and flavor of the wine. With my process, the long period of racking is reduced and the proper fermentation of the must is substantially insured while at the same time the essential elements for insuring the desirable bouquet and flavor are supplied. Also in the making of fortified wine, such as port, sherry, etc., the distilling material from which the fortifying spirit is produced, my process may be applied, with the result that the fermentation of the said material is improved in much the same manner as in the case of the wine itself, and with an improved bouquet and flavor in the resultant spirit or brandy. The addition of such spirit or brandy to the wine produced by my process, obviously results in an improved fortified wine.

In detail 1 represents a fermenting tank or fermenters for fresh must or sterile juice. This tank may, or may not contain cooling coils to control the temperature, so far as is possible, although the temperature may vary from about 70° F. to about 100° F., according to climatic conditions, yeast, and character of fermentation. In tank 1 fermentation is permitted until the desired stage is reached, which may vary according to the wine to be produced, and the wine is then passed, through screens 2 to remove the pomace. The pomace is then compressed and the expressed material is passed back into tank 1, while the juice from said tank passes into a cooling tank 3 where it is cooled by conventional cooling unit 4, or by any other desired means, to from about 75° F. to about 50° F.

Normally, the movement of wine into tank 3 and from said tank is continuous, since there may be any number of fermenting tanks 1.

The wine from refrigerating tank 3 is continuously passed in its cooled condition to centrifuges 5, where the lees are separated from the juice and are returned in their cooled condition back into tank 1.

This cooling step is a highly important one, since by said cooling the undesirable wild yeast is inactivated, but the natural desirable wine yeast remains highly active, and by the mechanical separation of the lees from the juice by the centrifuge, at the lowered temperature, there is no loss of alcohol during the separating step. Also by returning the cooled lees to the fermenting tank 1, the temperature of the must in said tank is lessened, to the extent of the cooled returning wine and solids, thus tending to prevent the must from rising to an undesirable degree, and the natural wine yeast, being predominantly active in the cooled lees, is able to more properly produce the desired fermentation in tank 1 and to produce the essential subsidiary products in the lees that are essential to the production of the much desired improved flavor and bouquet in the wine.

Hereetofore attempts have been made to effect quick mechanical separation of the lees from the must and the insolubles from hot newly fortified wine by centrifuges, but without lowering the temperature of the must, with the result of an appreciable loss of alcohol. Also the pitching of must by adding natural wine yeast thereto in the fermenting tank or tanks, has been tried, but an undesirable rise in temperature in the fermenting tank by this latter process results in many instances in defeating the very purpose for which the yeast was added, since with the increased temperature and agitation by pitching, the natural yeast becomes inactive and the undesirable wild yeasts become active. Also, by pitching must with natural yeast, not as great an amount of the desired benefits from the subsidiary products, such as oils and esters in the lees that are the result of the action of the natural yeast therein, are obtained.

While one centrifuge might be employed instead of the two centrifuges, 5, since this is a continuous process, to be carried out as rapidly as conditions permit, it is more desirable to use the pair of centrifuges. The volume of wine passed by the pair is greater and in the event of clogging of one or the other, the clogger centrifuge may be shut off for cleaning without stopping the movement of the wine through the other.

From centrifuges 5 the lees pass to a sump 6 from which they are pumped back into the fermenting tank at from 50° F. to 75° F., but in most instances the temperature of the must passed to the centrifuges, and also the temperature of the lees passed back to tank 1, is about 65° F.

The clear juices from the centrifuges 5 are preferably passed to a second cooling or refrigerating tank 3' where the temperature may be reduced to as low as 10° F., or may be merely maintained at substantially the same temperature as it leaves the tank 3, or somewhere between about 10° F. and about 75° F. This cooled juice in tank 3' may be drawn directly from tank 3' and passed to centrifuge 7 where oxidization takes place, which oxidization is greatly increased by reason of the lowered temperature and the fact that the juice contains less $CO_2$ when it passes to tank 3', and any solids that might still be in the juice are returned to the sump 6 for repassage to the tank or tanks 1. Of course the lower the temperature of the wine drawn from tank 3' to the centrifuge 7, the greater the oxygenation, and the faster the aging. It is important to note that the lowered temperature also eliminates the chance of loss in alcohol.

From tank 3 the wine may be passed directly to the fortifying tanks 8 or may be passed through the conventional filter 9 and then to the fortifying tanks.

In certain instances tank 3' may be merely in the form of a storage tank, in which case the temperature of the wine therein is about 15° F., and if desired, the tartrates may be substantially precipitated out of the wine at this point by reason of the very low temperature. But unless it is the intention to completely finish the wine at this stage, the wine would in no instance be reduced to a degree materially less than that necessary to prevent loss of alcohol.

Also provision is made for passing the wine directly from the tank 3' to the fortifying tanks by pump 11 for passage through filter 9 or for passage directly to tanks 8 without passage through the filter.

The foregoing description involves the passage of the lees to the fermenting tank 1, but these lees may be passed to a tank 10 which is a distilling material tank. Of course tank 10 may be the same as fermenting tanks 1, but for clarity is shown as a separate tank. When the lees are returned to tank 10, several further fermentations may be carried on in said tank, or tanks, by addition of water, instead of the must, if desired, to exhaust the alcohol producing properties of the lees, and after each fermentation the brandy thus produced passes through line 12 to the distilling apparatus 13 and the alcohol therefrom is drawn through line 14 to the fortifying tanks 8. This brandy is of improved flavor and bouquet for the same reason as the wine that is produced from the must to which the lees are returned.

As already stated, the wine produced by my process as herein described is what is known as unfinished wine. The usual steps of pasteurization, congealing the albuminoids, balancing the acidity, etc., would necessarily follow, but the wine so finished is of improved bouquet and flavor and the content of substantially tartrates only, which readily settle out or which may be readily removed. The rapid and effective oxygenation of the wine, free from the lees, reduces the normal period of aging materially and the mechanical removal of the lees saves time and space, since where the lees are allowed to settle out in the usual manner in tanks such as tanks 8, approximately 3–3½% of the contents of such tanks is made of the lees. By my process, substantially the full capacity of the tanks is utilized for clear juice.

Where unfortified wines, such as dry wines, are to be produced, the fortifying tanks become storage or holding tanks, and therefore this process is not necessarily restricted to the making of fortified wine.

It is obvious that another of the desirable features of my invention is that tartrates of relatively high purity are recoverable from tanks, such as tanks 8 when the latter are used for storage purposes, since the tartrates remain in the wine after the lees are removed, and therefore settle in the storage tanks free from the lees. Heretofore where both the lees and tartrates settle in the storage tanks, this result does not occur.

Having described my invention, I claim:

1. The method of making wine that includes the steps of separating the lees from fermented must while maintaining the temperature of said must at from about 75° to about 50° F., and returning the lees so separated back to fresh must for continuance of fermentation thereof and for promoting fermentation of the fresh must.

2. The method of making wine that includes the steps of fermenting fresh must to the desired degree, then removing the pomace therefrom and cooling the juice and lees to from about 75° F. to about 50° F. and separating the lees from the juice while maintaining the lees at about 75° F. to about 50° F. and thereafter returning the lees to fresh must at about 75° F. to about 50° F. for continuance of fermentation thereof and for promoting fermentation of the fresh must.

3. The method of making wine that includes the steps of cooling the fermented must, separating the lees from the cooled must, returning the cooled lees to fresh must and thereafter, oxygenating the cooled wine from which the lees have been removed at a temperature from about 75° F. to 30° F.

4. The method of making wine that includes the steps of passing fermented must along a path of travel at a predetermined rate of movement, cooling the fermented must at a point in said path and at a second point along said path separating the cooled lees from the juice and thereafter oxygenating the juice and ejecting the cooled lees into a fermenting tank for continuing fermentation of the lees therein.

5. The method of making wine that includes the step of controlling the temperature of must during fermentation thereof and accelerating said fermentation by ejecting lees of a lower temperature than must thereinto during a period of active fermentation of said lees.

6. The method of making wine that includes the steps of fermenting fresh must in a tank, withdrawing the fermented must from said tank and separating the pomace therefrom, then cooling the must from which the pomace has been removed to about 60° F. to 65° F. and immediately thereafter separating the lees from the cooled must by centrifugal force, returning the cool, separated, lees to said tank for mixing with fresh must therein, mixing air with the cool juice from which the lees have been separated for oxygenating the cool juice and thereafter collecting said juice in a tank for further treatment.

FRANK W. HOPPER.